United States Patent
Marcus et al.

(10) Patent No.: US 9,569,714 B2
(45) Date of Patent: Feb. 14, 2017

(54) SYSTEM AND METHOD FOR AUTOMATED RFID QUALITY CONTROL

(75) Inventors: Chris Marcus, Simpsonville, SC (US); Edward A. Armijo, Fountain Inn, SC (US)

(73) Assignee: AVERY DENNISON RETAIL INFORMATION SERVICES, LLC, Westborough, MA (US)

( * ) Notice: Subject to any disclaimer, the term of this patent is extended or adjusted under 35 U.S.C. 154(b) by 0 days.

(21) Appl. No.: 13/093,933

(22) Filed: Apr. 26, 2011

(65) Prior Publication Data

US 2012/0274448 A1    Nov. 1, 2012

(51) Int. Cl.
   *H04Q 5/22*         (2006.01)
   *G06K 19/07*        (2006.01)

(52) U.S. Cl.
   CPC .................. *G06K 19/0722* (2013.01)

(58) Field of Classification Search
   USPC ......................................................... 340/10.1
   See application file for complete search history.

(56) References Cited

U.S. PATENT DOCUMENTS

| | | | |
|---|---|---|---|
| 5,983,363 A | 11/1999 | Tuttle et al. | |
| 6,223,098 B1 * | 4/2001 | Cheong et al. | 700/223 |
| 6,522,939 B1 * | 2/2003 | Strauch et al. | 700/116 |
| 7,375,636 B1 * | 5/2008 | Martin | 340/572.1 |
| 2006/0213600 A1 * | 9/2006 | Wu et al. | 156/79 |
| 2006/0213609 A1 * | 9/2006 | Green et al. | 156/265 |
| 2006/0226982 A1 | 10/2006 | Forster | |

FOREIGN PATENT DOCUMENTS

| | | |
|---|---|---|
| CN | 101484272 | 7/2009 |
| EP | 0610956 | * 8/1994 |
| WO | 2006110414 | 10/2006 |
| WO | 2007131228 | 11/2007 |

OTHER PUBLICATIONS

International Preliminary Report on Patentability and Written Opinion dated Oct. 29, 2013 for International Application No. PCT/US2012/033240.
International Search Report dated Oct. 11, 2012 for International Application No. PCT/US2012/033240.

* cited by examiner

*Primary Examiner* — Brian Zimmerman
*Assistant Examiner* — Thomas McCormack
(74) *Attorney, Agent, or Firm* — Avery Dennison Retail Information Services, LLC

(57) ABSTRACT

A system and method is described for an automated RFID quality control process. The method may include configuring an RFID manufacturing press with quality control specifications, manufacturing a batch of RFID inlays, executing a performance test on each RFID inlay, comparing the results of the performance test to the quality control specifications, and determining a pass or fail status for the batch of RFID inlays based on the results of the performance test. The system may include an RFID manufacturing press having at least one lane, at least one interrogator antenna, and programmable control logic for the RFID manufacturing press, wherein the programmable control logic is adapted to execute a performance test on each RFID relay of a batch of RFID relays output by the manufacturing press, compare the results of the performance test to user-configurable quality control specifications, and determine whether the batch of RFID relays meets the specifications.

16 Claims, 2 Drawing Sheets

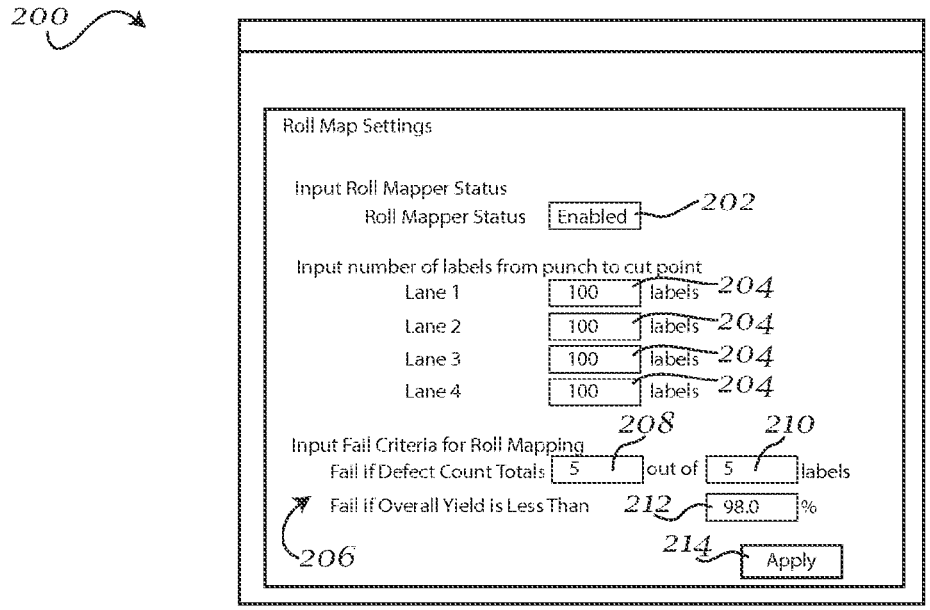
*Fig. 2a*
| LANE | STATUS | TOTAL | BAD | YIELD | SPLICES |
|---|---|---|---|---|---|
| Lane 4 | Pass | 100 | 0 | 100 | 0 |
| Lane 3 | Pass | 100 | 1 | 99 | 0 |
| Lane 2 | Fail | 100 | 3 | 97 | 2 |
| Lane 1 | Pass | 100 | 0 | 100 | 0 |
*Fig. 2b*
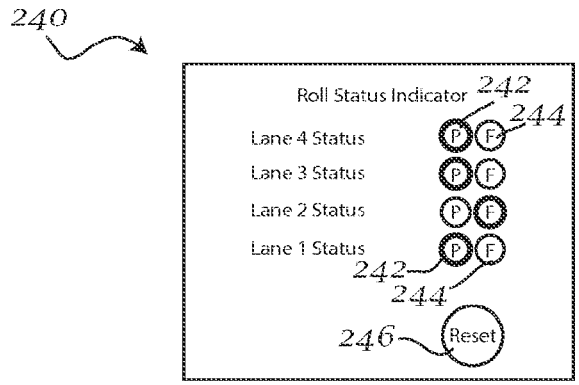
*Fig. 2c*

SYSTEM AND METHOD FOR AUTOMATED RFID QUALITY CONTROL

BACKGROUND OF THE INVENTION

The use of radio frequency identification (RFID) tags to track, identify and locate goods has grown significantly in recent years. RFID tags allow manufacturers, distributors and retailers, amongst others, to regulate products and inventory, quickly determine production, manufacture, distribution or retail needs and efficiently intake and outtake items utilizing RFID tags. The RFID tags themselves can provide any desired product data and may be scanned or read in any of a variety of manners.

After the manufacturing process, RFID tags may go through one of several packaging processes. For example, certain types of RFID tags may be packaged into rolls for convenient bulk shipment to the customer. Prior to shipment, however, RFID tags may go through a quality control process, wherein it is determined whether the particular roll of RFID tags meets customer specifications as to yield and consecutive defects. For example, a customer may require that each roll of RFID tags has a 98% yield of working tags, and that no more than five consecutive tags be defective. To determine whether a roll of RFID tags meets customer requirements, each roll can be inspected by going through an editing process. This process typically takes place after the RFID tag roll exits the manufacturing press. Typically the roll of inlays would be taken off of a line and visually inspected, and the defective inlays would then be cut out of the web before the roll was ready for shipment. This process can be time consuming and labor intensive relative to the other steps of the manufacturing process, resulting in bottlenecks prior to shipment.

As RFID manufacturing techniques improve, the yield percentages have increased and the numbers of consecutive defective tags have decreased. In many instances, more than 90% of RFID rolls have met customer requirements. It has thus become desirable to bypass the editing processes so as to streamline the manufacturing process, minimize bottlenecks, and reduce costs.

SUMMARY OF THE INVENTION

According to at least one exemplary embodiment, a system and method for automated RFID quality control is provided. The method may include configuring an RFID manufacturing press with quality control specifications, manufacturing a batch of RFID inlays, executing a performance test on each RFID inlay, comparing the results of the performance test to the quality control specifications, and determining a pass or fail status for the batch of RFID inlays based on the results of the performance test. The method may further include recording the results of the performance test, continuously monitoring the recorded results, and indicating the pass or fail status of the batch of RFID inlays for each lane of the RFID manufacturing press.

The system may include an RFID manufacturing press having at least one lane, at least one interrogator antenna, and programmable control logic for the RFID manufacturing press, wherein the programmable control logic is adapted to execute a performance test on each RFID relay of a batch of RFID relays output by the manufacturing press, compare the results of the performance test to user-configurable quality control specifications, and determine whether the batch of RFID relays meets the specifications. The control logic may further be adapted to record the results of the performance test, continuously monitor the results of the performance test, and indicate a pass or fail status for the batch of RFID relays. The system may further include an interface for inputting the quality control specifications, an interface for displaying the recorded results of the performance test, and an interface for indicating the pass or fail status of the batch of RFID inlays for each lane of the RFID manufacturing press.

BRIEF DESCRIPTION OF THE FIGURES

Advantages of embodiments of the present invention will be apparent from the following detailed description of the exemplary embodiments. The following detailed description should be considered in conjunction with the accompanying figures in which:

FIG. 2a shows an exemplary configuration interface for a system for automated RFID quality control.

FIG. 2b shows an exemplary data display interface for a system for automated RFID quality control.

FIG. 2c shows an exemplary status indicator interface for a system for automated RFID quality control.

DETAILED DESCRIPTION OF THE INVENTION

Figure 1:
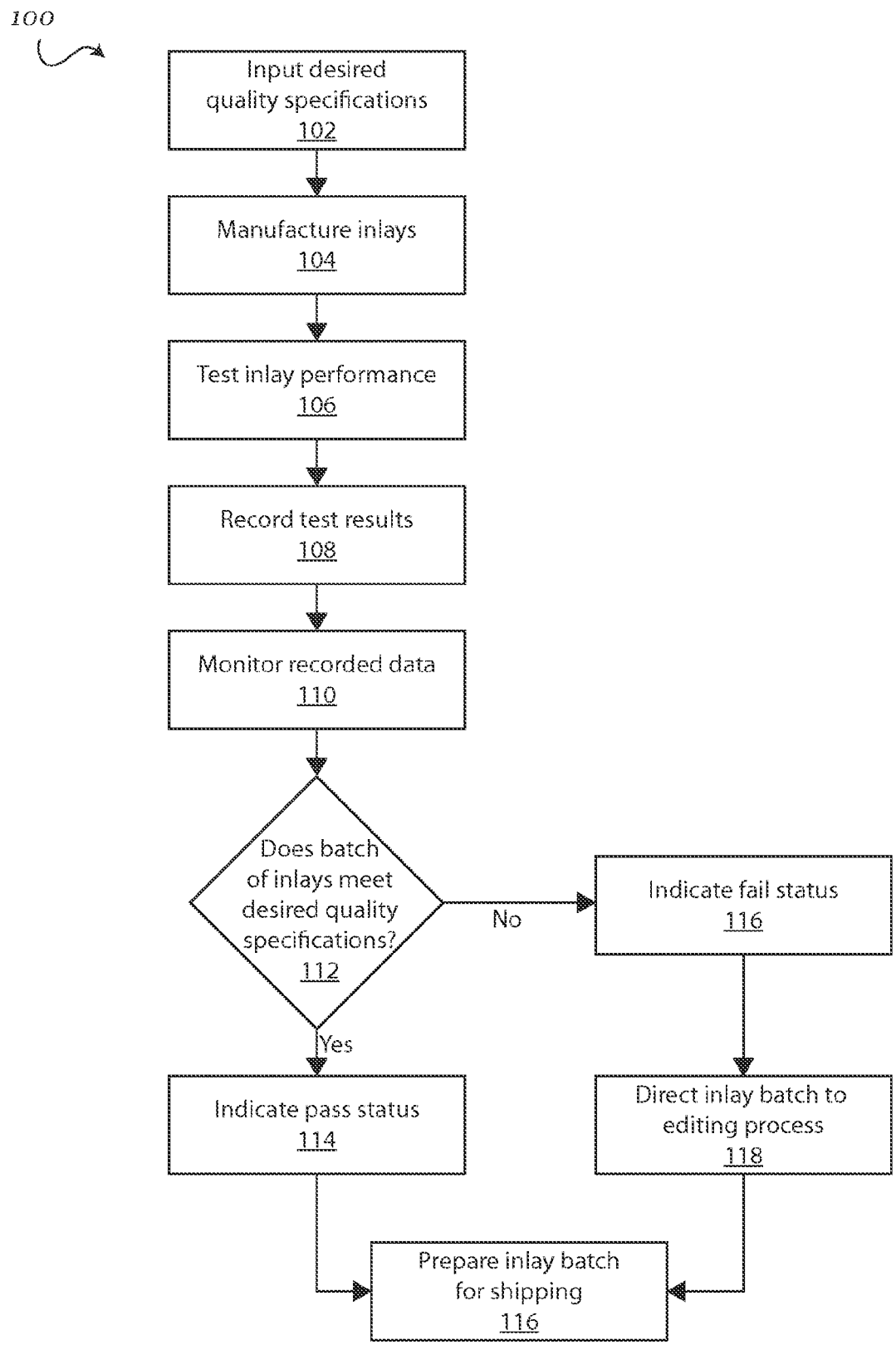
FIG. 1 shows an exemplary method for automated RFID quality control.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation. Furthermore, RFID tags may be manufactured and grouped in a variety of arrangements, for example, rolls, sheets, or any other arrangement. It should be understood that a "batch" of RFID inlays, as used herein, may refer to any desired arrangement or grouping of RFID inlays.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

According to at least one exemplary embodiment, a system and method for automated RFID quality control is disclosed. The automated RFID quality control system and method can allow operators to conclusively determine which batches of RFID inlays meet customer specifications without subjecting each batch to an editing process. The automated RFID quality control system and method may be integrated into existing RFID manufacturing apparatuses and into the operating and control systems thereof. For example, an existing RFID press and any associated computer logic and software may be modified to incorporate the features and steps of the automated RFID quality control system and method. As RFID presses may include a plurality of RFID manufacturing lanes, the automated RFID quality control system can be configured to simultaneously manage a plurality of RFID manufacturing lanes.

FIG. 1 shows an exemplary process for RFID quality control. At step 102, and prior to commencing the RFID manufacturing process, the RFID press may be configured by an operator so as to include desired specifications for the particular batch of RFID inlays to be manufactured. The present invention further contemplates that the RFID press may be configured by an operator to include specifications for a batch of inlays after the RFID inlays are manufactured. During configuration of the RFID manufacturing press, the operator may further input desired quality specifications for the particular batch of RFID inlays. For example, the operator may enter a yield requirement and a defect density requirement for the RFID inlays batch. As a further example, such requirements may be a 98% yield requirement and a maximum defect density of five consecutive defective tags; however, any desired value for these specifications may be entered. The operator may also enter any other necessary configuration information and start the RFID manufacturing press.

FIG. 2a shows an exemplary configuration interface 200 for a system for automated RFID quality control. Configuration interface 200 may include a widget 202 for enabling and disabling the automatic RFID quality control system on a particular RFID press. Configuration interface 200 may further include fields 204 for entering a total number of RFID inlays from the point of quality inspection to the point of rewind. This creates a dynamic shift register which offsets the inspection results to ensure that the results are representative of the inlays that have traveled beyond the point of rewind and are contained in the rewind roll. A field 204 may be provided for each lane in the RFID press. Configuration interface 200 may further include criteria 206 that would trigger a fail condition. Fail criteria 206 may include a maximum number of defective inlays that may appear in a consecutive sequence of inlays. For example, the system may be configured to allow no more than 5 consecutive defective tags, or no more than 5 defective tags in a sequence of 10 tags. These values may be entered into fields 208 and 210 of configuration interface 200. Fail criteria 206 may also include yield requirements, which may be entered into field 212 of configuration interface 200. In some embodiments, fail criteria 206 may be provided for every lane in the RFID manufacturing press. Furthermore, additional quality specifications and fail criteria may be contemplated and included in interface 200 as desired. A widget 214 for saving the entered quality specifications and fail criteria may also be provided.

Turning back to FIG. 1, at step 104, the RFID press can be engaged in the manufacturing process. Subsequent to the manufacturing process, at step 106, the RFID inlays may be tested so as to determine whether the inlays are operational. For example, the RFID inlays are scanned by an interrogator antenna, or any arrangement of interrogator antennas known in the art that enables the system to function as described herein. The RFID inlays may also be scanned by a RFID reader to determine functionality. The interrogator antenna may perform an RF performance test on the RFID inlays, and may determine the status of each inlay in the batch of RFID inlays. At step 108, the operational status of each RFID inlay, and any other desired information, may then be recorded and the resultant data may be entered into a database, or any other desired data storing and organization system. The RF performance test may be performed continuously during operation of the press. Similarly, the results of the RF performance test may be processed and analyzed continuously during operation of the press. The system can thus maintain a record of the total number of RFID inlays scanned, the amount of operational inlays, and the amount of defective inlays. Such records can be maintained for each lane in the RFID manufacturing press. Furthermore, the recorded data may be displayed and updated in real time, for example on a monitor display visible to the operator. Additionally, defective RFID inlays may be marked by the system so that they may subsequently be easily identified.

FIG. 2b shows an exemplary display interface 220 for displaying the recorded data. Interface 220 may tabulate recorded data for each lane of the RFID manufacturing press. Displayed data may include lane identifier 222, lane status 224, total number tags to be manufactured per lane 226, number of defective tags per lane 228, total yield per lane 230, and number of splices per lane 232. Additional data may also be contemplated and displayed as desired. Such data may include, for example, the number of consecutive bad tags per lane, and the number of groups of consecutive bad tags per lane.

Turning back to FIG. 1, at step 110, the automated RFID quality control system may continuously monitor the recorded data for each lane in the RFID manufacturing press on which the system is being utilized, and may continuously compare the recorded data to the quality specifications input into the system at the beginning of the process. At step 112, the system may then determine whether a particular batch of RFID inlays has met the quality specifications. The system may then indicate to the operator, at step 114 or step 116, whether the batch has met the quality specifications. To this end, the system may further include a "pass" status indicator and a "fail" status indicator for each lane in the RFID manufacturing press. For example, each lane may include a green LED to indicate a "pass" status and a red LED to indicate a "fail" status. Alternatively, any other indicators known in the art may be utilized, for example illuminated signs, displays, audio signals, or any combination thereof.

FIG. 2c shows an exemplary embodiment for a status indicator interface 240 for the automated RFID quality control system. Status indicator interface 240 may include a pass indicator 242 and a fail indicator 244. Indicators 242, 244 may be provided for each lane of the RFID manufacturing press.

The system may be configured to change the status of a lane from "pass" to "fail" if one of the quality specifications is not met. For example, utilizing the example specifications stated above, the system may indicate a fail status if greater than 2% of the RFID inlays in a particular lane are inoperative, or if at least five consecutive RFID inlays are found to be inoperative. To assess percentage yield of operative RFID inlays, the total number of inlays to be manufactured may be input into the system during configuration, or the system may perform the yield assessment after receiving an indication that the manufacturing process has terminated.

A reset widget 246 may also be provided so as to allow the operator to reset the status of one or all lanes of the RFID manufacturing press. Reset widget 246 may also allow the operator to save the recorded data to the database of the system.

Again returning to FIG. 1, as the system allows the operator to conclusively determine whether a batch of RFID inlays meets customer specifications, the batches of inlays that have a "pass" status may proceed to step 116, and be packaged for shipment directly off the RFID manufacturing press. Batches of RFID inlays having a "fail" status may be directed step 118, which may be an edit process whereby the defective inlays are removed from the batch. For example, rolls of dry RFID inlays that are determined as not meeting customer specifications may be directed to an editing apparatus that can unwind the rolls, identify the defective inlays, and perform a splicing procedure whereby the defective inlays are removed from the roll. As a further example, wet inlays may be directed through an auto-edit apparatus, whereby defective inlays are flagged, removed and substituted with operational inlays. Subsequent to the editing process, the batches of RFID inlays may be directed to step 116 for shipping.

The system and method for automated RFID quality control described herein may thus facilitate speedier RFID production by removing bottlenecks arising from the necessity of subjecting each batch of RFID inlays to an editing process. The system and method described herein can allow the operator to conclusively determine which batches meet customer specifications without subjecting each batch to the editing process. Since, with modern manufacturing techniques, a significant majority of batches of RFID inlays do in fact meet customer specifications, allowing such batches to bypass the editing processes may result in significant savings in time, costs, and labor per unit for the RFID manufacturing process.

The present invention further contemplates that the systems and methods for automated RFID control is not limited to determining whether a RFID device is granted a pass or fail status based on the results of a performance test. For instance the method and system of the present invention could be used to differentiate RFID based on types and sizes of antennas utilized, differentiated based on customer, size of the device, the utilization of certain components used with RFID.

The present invention also contemplates that the system and methods provided by the present invention are not limited to RFID devices but can also distinguish the functionality and defectiveness of RFID components such as antennas and chips used in RFID devices. The chips would be granted a pass or fail status for the batch of chips based on the results of the performance test according to the method for automated quality control of the present invention.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for automated RFID quality control for an RFID manufacturing press having one or more lanes, comprising:
   configuring the RFID manufacturing press with quality control specifications for at least one batch of RFID inlays before a series of RFID inlays are manufactured, such quality control specifications including at least one fail condition and at least of: a number of RFID inlays to be inspected in each batch, and a number of manufacturing lanes to be inspected;
   configuring an interface and the interface displays at least a lane identifier, lane status, number of defective tags per lane, total yield per lane, and number of splices per lane;
   and
   wherein the fail conditions include: a maximum number of defective inlays that may appear in a consecutive sequence of inlays, and a yield requirement and the quality control specifications test RFID components including chips and antennas;
   manufacturing the series of RFID inlays;
   selecting a batch of RFID inlays from the series of RFID for evaluation of the quality control specifications;
   executing a performance test on each RFID inlay of the selected batch of RFID inlays;
   comparing the results of the performance test to the quality control specifications;
   determining a pass or fail status for the selected batch of RFID inlays based on the results of the performance test such that the method includes a pass status indicator and a fail status indicator for each manufacturing lane;
   sending the selected batch of RFID inlays having at least one of the RFID inlays of the batch of RFID inlays having the fail status to an auto editing process that is separate from the RFID manufacturing press;
   removing the at least one of the RFID inlay with the fail status from the batch; and
   packaging the batch of RFID inlays.

2. The method of claim 1, further comprising recording the results of the performance test.

3. The method of claim 2, further comprising continuously monitoring the recorded results.

4. The method of claim 1, further comprising:
   indicating the pass or fail status of the batch of RFID inlays for each lane of the RFID manufacturing press.

5. The method of claim 1, further comprising directly packaging a batch of RFID inlays having a pass status.

6. The method of claim 1, further comprising substituting operative RFID inlays for those inlays with a fail status based on the results of the performance test.

7. A system for automated RFID quality control, comprising:
   an RFID manufacturing press having at least one lane;
   at least one interrogator antenna;
   an interface for inputting the quality control specifications in which the interface includes fields for entering a total number of RFID inlays from a point of quality inspection to a point of rewind in which a field is provided for the at least one lane in the RFID manufacturing press; and programmable control logic for the RFID manufacturing press;

wherein the programmable control logic is adapted to
receive user-configurable quality control specifications for the manufacture a series of RFID inlays, such quality control specifications including at least one of: the number of RFID inlays to be inspected in each batch, a number of manufacturing lanes to be inspected, a maximum number of defective inlays that may appear in a consecutive sequence of inlays, a yield requirement, and the quality control specification test RFID components including chips and antennas, execute a performance test on each RFID relay of the batch of RFID relays output by the RFID manufacturing press, compare the results of the performance test to the user-configurable quality control specifications, determine whether the batch of RFID relays meets the user-configurable quality control specifications;

indicate a pass or fail status of the RFID inlays in the batch of RFID inlays; and removing the RFID inlays with a fail status from the batch with a splicer.

8. The system of claim 7, wherein the programmable control logic is further adapted to record the results of the performance test.

9. The system of claim 7, further comprising an interface for displaying the recorded results of the performance test.

10. The system of claim 7, wherein the programmable control logic is further adapted to continuously monitor the results of the performance test.

11. The system of claim 10, wherein the interface indicates the pass or fail status of the batch of RFID inlays for the at least one-lane of the RFID manufacturing press.

12. The method of claim 1, wherein the configuring is completed by an operator.

13. The method of claim 1, wherein the interface includes fields for entering a total number of RFID inlays from a point of quality inspection to a point of rewind in which a field is provided for each lane in the RFID manufacturing press.

14. The system of claim 7, further comprising a reset wizard.

15. The system of claim 14, wherein the reset wizard allows an operator to save recorded data to the database of the system.

16. The system of claim 7, wherein the system is able to distinguish functionality of an RFID antenna and/or RFID chip.

* * * * *